US011736358B2

(12) United States Patent
Baird et al.

(10) Patent No.: US 11,736,358 B2
(45) Date of Patent: Aug. 22, 2023

(54) INTERFACING EVENT DETECTORS WITH A NETWORK INTERFACE

(71) Applicant: Transform SR Brands LLC, Hoffman Estates, IL (US)

(72) Inventors: Joseph Reid Baird, Sammamish, WA (US); Rahil Jain, Bellevue, WA (US); Peter Christopher Mullen, Seattle, WA (US); Parag Kumar Garg, Woodinville, WA (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 15/411,141

(22) Filed: Jan. 20, 2017

(65) Prior Publication Data
US 2018/0212832 A1    Jul. 26, 2018

(51) Int. Cl.
*H04L 41/12* (2022.01)
*G08B 25/10* (2006.01)
*H04W 84/10* (2009.01)

(52) U.S. Cl.
CPC .......... *H04L 41/12* (2013.01); *G08B 25/10* (2013.01); *H04W 84/10* (2013.01)

(58) Field of Classification Search
CPC ....... H02J 3/00; G05B 13/048; G08B 25/008; G08B 25/009
See application file for complete search history.

(56) References Cited

U.S. PATENT DOCUMENTS

| 2007/0159321 A1* | 7/2007 | Ogata | A61B 5/0002 340/539.12 |
| 2009/0115385 A1* | 5/2009 | Williams | H05B 47/13 323/282 |
| 2010/0040375 A1* | 2/2010 | Sexton | H04B 10/00 398/104 |
| 2011/0115624 A1* | 5/2011 | Tran | G08B 21/0446 340/540 |
| 2012/0191440 A1* | 7/2012 | Meagher | G06F 30/00 703/18 |
| 2012/0216252 A1* | 8/2012 | Skaaksrud | H04W 12/06 726/3 |
| 2013/0204581 A1* | 8/2013 | Park | A01M 1/026 702/188 |
| 2015/0119079 A1* | 4/2015 | Tarlazzi | H04W 64/00 455/456.1 |

(Continued)

OTHER PUBLICATIONS

QoS mapping from user to network requirements in WMSN: a fuzzy logic based approach , Nagesha et al., IEEE Xplore (Year: 2014).*

*Primary Examiner* — Yu-Wen Chang
(74) *Attorney, Agent, or Firm* — McAndrews, Held & Malloy, Ltd.

(57) ABSTRACT

Techniques and systems are provided for interfacing one or more event detectors coupled by a common interconnect with a network interface. Interconnect signals indicative of events detected by the one or more event detectors using sensor data are propagated on the common interconnect. A monitor device indirectly or directly couple to the common interconnect monitors the interconnect signals. Information about a first event detector of the one or more event detectors is inferred, in part, from the interconnect signals and transmitted via the network interface.

20 Claims, 9 Drawing Sheets

(56) References Cited

U.S. PATENT DOCUMENTS

| | | | |
|---|---|---|---|
| 2015/0177887 A1* | 6/2015 | Schwartz | G06F 3/0412 |
| | | | 345/174 |
| 2015/0254570 A1* | 9/2015 | Florence | H05B 47/105 |
| | | | 706/52 |
| 2015/0276976 A1* | 10/2015 | Holenarsipur | G06F 1/169 |
| | | | 250/338.1 |
| 2015/0310239 A1* | 10/2015 | Kuhl | G07C 9/28 |
| | | | 340/10.5 |
| 2015/0355239 A1* | 12/2015 | Augustoni | G01R 31/42 |
| | | | 327/548 |
| 2016/0050264 A1* | 2/2016 | Breed | H04L 12/2825 |
| | | | 709/217 |
| 2016/0117868 A1* | 4/2016 | Mitchell | H04L 63/0428 |
| | | | 701/32.3 |
| 2016/0142758 A1* | 5/2016 | Karp | G08B 17/10 |
| | | | 725/25 |
| 2016/0345858 A1* | 12/2016 | Tromberg | A61B 5/1128 |
| 2017/0018167 A1* | 1/2017 | Dey | G08B 25/002 |
| 2017/0059518 A1* | 3/2017 | Feng | C12M 41/26 |
| 2017/0095176 A1* | 4/2017 | Sun | A61B 5/7225 |
| 2017/0124853 A1* | 5/2017 | Mehta | G08B 25/009 |
| 2017/0126578 A1* | 5/2017 | Amulothu | H04L 47/70 |
| 2017/0339653 A1* | 11/2017 | Hui | H04L 41/0859 |
| 2017/0364818 A1* | 12/2017 | Wu | G06F 11/3006 |
| 2018/0088686 A1* | 3/2018 | Zuber | G06F 3/03544 |
| 2018/0130340 A1* | 5/2018 | Petrucci | G08B 29/14 |

\* cited by examiner

INTERFACING EVENT DETECTORS WITH A NETWORK INTERFACE

BACKGROUND

This disclosure relates generally to interfacing existing event detectors that may be undiscoverable by network nodes with a network interface. Examples of such event detectors include conventional smoke detectors that are typically interconnected by a common physical medium. By interconnecting conventional smoke detectors with the common physical medium, each of the smoke detectors may generate an alarm whenever any of the smoke detectors detect an event. Conventional smoke detectors accomplish with signals propagating on the common physical medium.

DETAILED DESCRIPTION OF EMBODIMENTS

Figure 1:
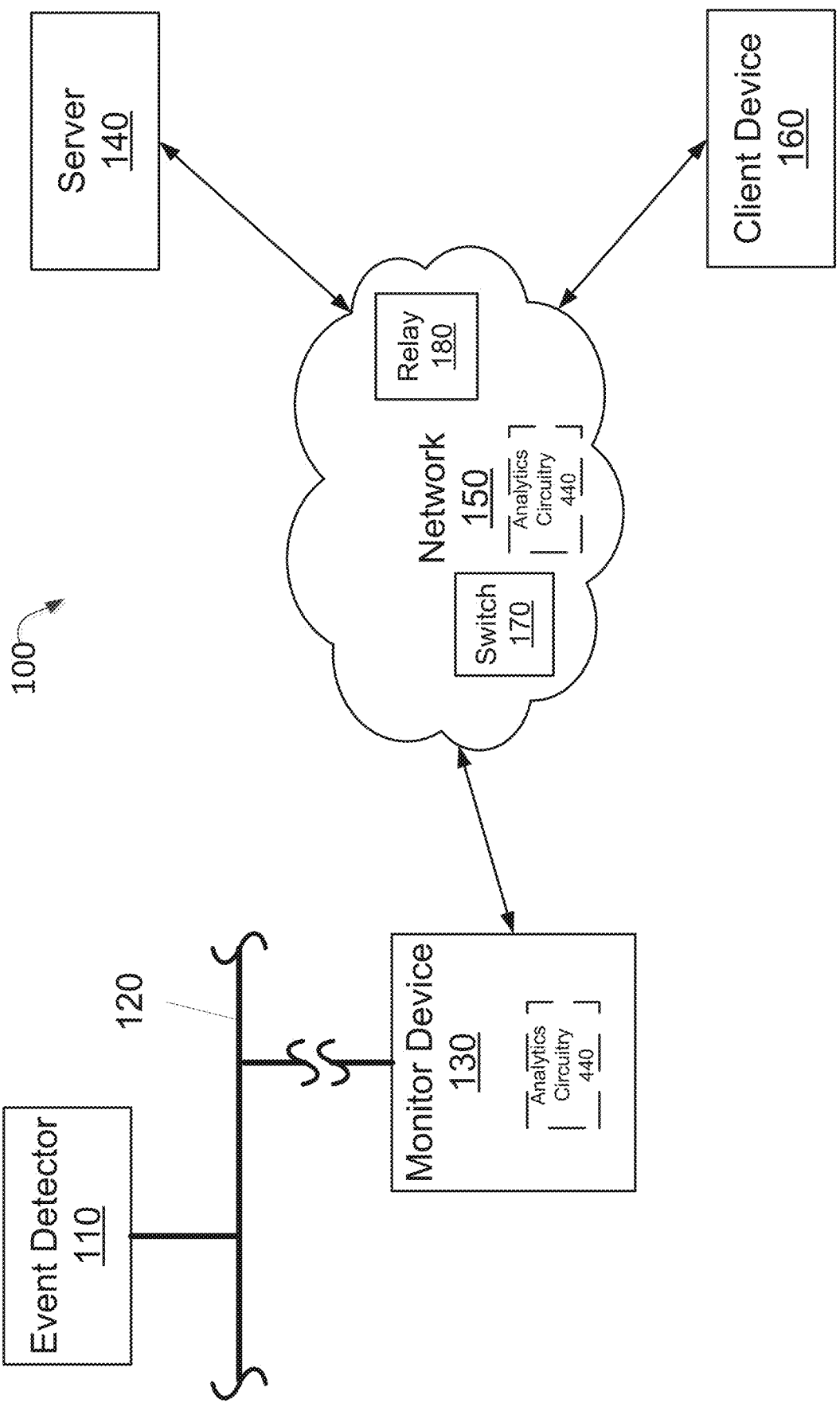
FIG. 1 depicts an example operational environment for implementing aspects of the present invention.

Various aspects of the technology described herein are generally directed to systems, methods, and computer-readable storage media for, among other things, interfacing event detectors with a network interface. As used herein, "connected device" refers to a device having network connectivity that is configured to communicate with other computing devices via one or more networks (e.g. network 150 of FIG. 1). That is, a connected device is capable serving as an endpoint, connection point, and/or a redistribution point of a communication session communicatively coupling the connected device with one or more computing nodes of a network. In contrast, "unconnected device" refers to a device lacking network connectivity that is not configured to communicate with other devices via one or more networks. In an embodiment, an "event detector" is an unconnected device.

Furthermore, although the terms "step," "block," or "component," etc., might be used herein to connote different components of methods or systems employed, the terms should not be interpreted as implying any particular order among or between various steps herein disclosed unless and except when the order of individual steps is explicitly described. As such, the examples provided are not intended to suggest any limitation as to the scope of use or functionality of the present invention. Neither should the examples provided be interpreted as having any dependency or requirement relating to any single component or combination of components depicted.

The present disclosure describes particular embodiments in terms of detailed construction and operation to meet statutory requirements. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

According to an aspect of the subject matter, a system is provided for interfacing one or more event detectors coupled by a common interconnect with a network interface. The system monitors interconnect signals propagating on the common interconnect that are indicative of events detected by the one or more event detectors. The system also analyzes the interconnect signals to generate interconnect data associated with a first event detector of the one or more event detectors. The interconnect data being information about the first event detector inferred, in part, from the interconnect signals. Furthermore, the system transmits the interconnect data to a remote client via the network interface.

In another embodiment, a computer-implemented method is provided for interfacing one or more event detectors coupled by a common interconnect with a network interface. The method includes receiving data from a first monitor device monitoring interconnect signals indicative of events detected by the one or more event detectors propagating on the common interconnect. The method also includes analyzing the data received from the first monitor device to generate a status report associated with a first event detector of the one or more event detectors. The status report including information about the first event detector inferred, in part, from the interconnect signals. The method further includes transmitting the status report to a remote client via the network interface.

In another embodiment, a system is provided for interfacing one or more event detectors coupled by a common interconnect with a network interface. The system receives data associated with interconnect signals propagating on the common interconnect at a server. The system also analyzes received data to generate a status report associated with a first event detector of the one or more event detectors. The status report including information about the first event detector inferred, in part, from the interconnect signals.

Furthermore, the system transmits the status report to a remote client via the network interface.

Turning to FIG. 1, an example operational environment for implementing aspects of the subject matter is depicted and referenced generally by designator 100. For instance, monitor device 130 may implement methods 500 and 600 of FIGS. 5 and 6, respectively. The components shown in FIG. 1 are a few of the components that embodiments of the present invention may interact with during operation. Accordingly the components therein are described with an emphasis on function and in brief for the sake of simplicity. One skilled in the art will recognize that operational environment 100 is but one example of a suitable operational environment for implementing aspects of the invention. As such, system 100 is not intended to suggest any limitation as to the scope of use or functionality of the invention.

Operational environment 100 includes event detector 110, monitor device 130, server 140, and client device 160. Each of the components included in operational environment 100 are operatively coupled to each other as appropriate for carrying out their respective functions. For example, event detector 110 is interconnected with one or more event detectors (not shown) via a common physical medium (common interconnect 120) that is adapted to propagate interconnect signals among the event detectors. Also, monitor device 130, server 140, and client device 160 are configured to communicate data via network 150. In an embodiment, event detector 110 is incapable of communicating data via network 150. In an embodiment, operational environment 100 also includes switch 170 and router 180 to facilitate communication via network 170. In an embodiment, one or more of the functionalities described below with respect to monitor device 130 may be implemented in switch 170, router 180, or a combination thereof. Various embodiments of aspects of monitor device 130 are further described herein below with respect to FIGS. 13A-13C.

Event detector 110 is configured to detect at least one event associated with a physical environment proximate to event detector 110's location. Examples of suitable devices for implementing event detector 110 include a motion detector, a gas detector, a radio frequency ("RF") detector, a smoke detector, a presence detector, and the like. Event detector 110 detects the at least one event using sensor data indicative of a physical quantity associated with the physical environment. The sensor data that event detector 110 uses to detect the at least one event is provided by one or more sensors associated with event detector 110. In an embodiment, the one or more sensors include an internal sensor contained within a housing of event detector 110. Responsive to detecting the at least one event, event detector 110 causes an alert indicator associated with event detector 110 to generate a sensory notification that alerts nearby observers of the detected event. As used herein, "sensory notification" refers to sensory stimuli capable of being perceived by one or more senses of an observer.

Event detector 110 is further configured to forward an interconnect signal to the one or more event detectors via common interconnect 120. In an embodiment, an interconnect signal corresponds to an alert The interconnect signal configured to inform the one or more event detectors that event detector 110 has detected an event. In operational environment 100, interconnect signals are propagated among the event detectors to enable each of the event detectors to generate a sensory notification when any single event detector (e.g. event detector 110) detects an event. That is, each event detector among the one or more event detectors utilize interconnect signals to communicate to the remaining event detectors that an event was detected. Examples of interconnect signals are discussed below with respect to FIGS. 11-12. Accordingly, event detector 110 is configured to cause the alert indicator to generate a sensory notification in response to receiving an interconnect signal via common interconnect 120.

Monitor device 130 is generally configured to monitor interconnect signals associated with event detector 110 by interfacing with common interconnect 120. In an embodiment, monitor device 130 directly interfaces with common interconnect 120. For example, monitor device 130 may be directly hardwired to common interconnect 120. In an embodiment, monitor device 130 indirectly interfaces with common interconnect 120 thereby electrically isolating monitor device 130 from common interconnect 120. For example, monitor device 130 may indirectly interface with common interconnect 120 using optical, inductive, capacitive, or similar isolation coupling techniques.

Monitor device 130 is further configured to generate interconnect data based at least in part on interconnect signals propagating along common interconnect 120. As used herein "interconnect data" refers to information about an event detector inferred, in part, from interconnect signals propagating on a common physical medium interconnecting the event detectors. In an embodiment, interconnect data includes information about event detector 110's alarm status. For example, interconnect data may include information indicating that event detector 110's alarm status is activated (i.e. event detector 110 detected an event), non-activated (i.e. event detector 110 has not detected an event). In an embodiment, the interconnect data includes further information about the event detected by event detector 110. For example, what type of event was detected, where the event was detected, and the like. As another example, when multiple event detectors are interconnected via interconnect 120, interconnect data may include information about which event detector among the multiple event detectors detected an event.

In an embodiment, interconnect data includes information about an event detector's operational status. For example, interconnect data may include information indicating that event detector 110's operational status is fully functional, degraded functionality, non-functional, and the like. In an embodiment, monitor device 130 generates interconnect data that includes identifying information about event detector 110. For example, monitor device 130 may infer event detector 110's manufacturer, model number, configuration, and the like.

In an embodiment, monitor device 130 is configured to generate interconnect metadata based at least in part on secondary data associated with the interconnect data. As used herein "interconnect metadata" refers to information providing context to interconnect data that monitor device 130 obtains from sources external to the common interconnect. For example, interconnect metadata may include time stamp information, sensor data provided by sensors unassociated with event detector 110, a confidence value associated with current interconnect data derived from previous interconnect data, and the like.

Monitor device 130 is further configured to communicate any combination of interconnect data and interconnect metadata (if available) via network 150 to one or more devices for further processing. For example, monitor device 130 may communicate any combination of interconnect data and interconnect metadata to server 140 for further processing. In an embodiment, monitor device 130 communicates such data via network 150 on a continuous basis. In an embodiment, monitor device 130 communicates such data via network 150 on a periodic basis. In an embodiment, monitor device 130 receives a predefined interval (e.g. every 5 minutes, 12 minutes, hour, 2 hours, etc.) for the periodic basis from a remote client (e.g. server 140 or client device 160). In an embodiment, monitor device 130 communicates such data via network 150 in response to determining a predefined criterion is met. Examples of predefined criterion include event detector 110 detecting an event, event detector 110's operational status changes, a confidence value associated with current interconnect data falls below a predetermined threshold, and the like. In an embodiment, monitor device 130 communicates such data in response to a request from a remote device.

Server 140 provides computing resources to remote clients (e.g. monitor device 130 and client device 160) via network 150. Server 140 may be implemented using one or more computing devices each composed of well-known hardware components such as one or more processors coupled to network interfaces and storage devices. In an embodiment, a computing device further includes a virtualization component (e.g. hypervisor or virtual machine monitor) permitting a plurality of computing devices to share underlying physical hardware of the computing device. The one or more processors of server 140 execute various software components (e.g. computer executable instructions) loaded from non-transitory storage devices. By executing the software components, the one or more processors are configured to perform various functionalities on behalf of the remote clients.

In an embodiment, server 140 is a cloud-based server providing a shared pool of configurable computing resources to remote clients as a service. That is, server 140 may be implemented with a service-oriented architecture in which software components executing on hardware resources associate with server 140 provide services to other software components executing on remote devices (e.g. monitor device 130 and client device 160). Examples of such services provided by server 140 include infrastructure services, platform services, software application services, or a combination thereof. In an embodiment, any combination of interconnect data, interconnect metadata, and any other data corresponding to the interconnect signals propagating along common interconnect 120 is stored on server 140. In an embodiment, server 140 processes any combination of interconnect data, interconnect metadata, and any other data corresponding to the interconnect signals propagating along common interconnect 120 for client device 160's consumption.

Network 150 represents any communication network that enables computing devices to exchange data. Network 150 may include a combination of discrete networks that may use different communication protocols, but is depicted in simple form to not obscure other aspects of the present invention. For example, network 150 may be implemented using a cellular network, a WiFi/broadband network, a local area network (LAN), a wide area network (WAN), a telephony network, a fiber-optic network, the Internet, or a combination thereof.

Client device 160 represents a computing device that is adapted to exchange data with another computing device via network 150. Some lower-level details of client device 160 are not shown so as to not obscure embodiments of the present invention. For example, client device 160 may include a bus that directly or indirectly couples the following devices: memory; one or more processors; one or more presentation components such as a display or speaker; input/output (I/O) ports; I/O components; and a power supply such as a battery.

Client device 160 may take on any of a variety of forms. By way of example, client device 160 may be a mobile telephone, smart phone, laptop computing device, desktop computing device, server, tablet computer, personal digital assistant (PDA), or any other computing device. Client device 160 may be associated with a user. The user is the person submitting instructions and interacting with client device 160. Operational environment 100 may include any number of client devices. A single client device is shown for the sake of simplicity.

Figure 2:
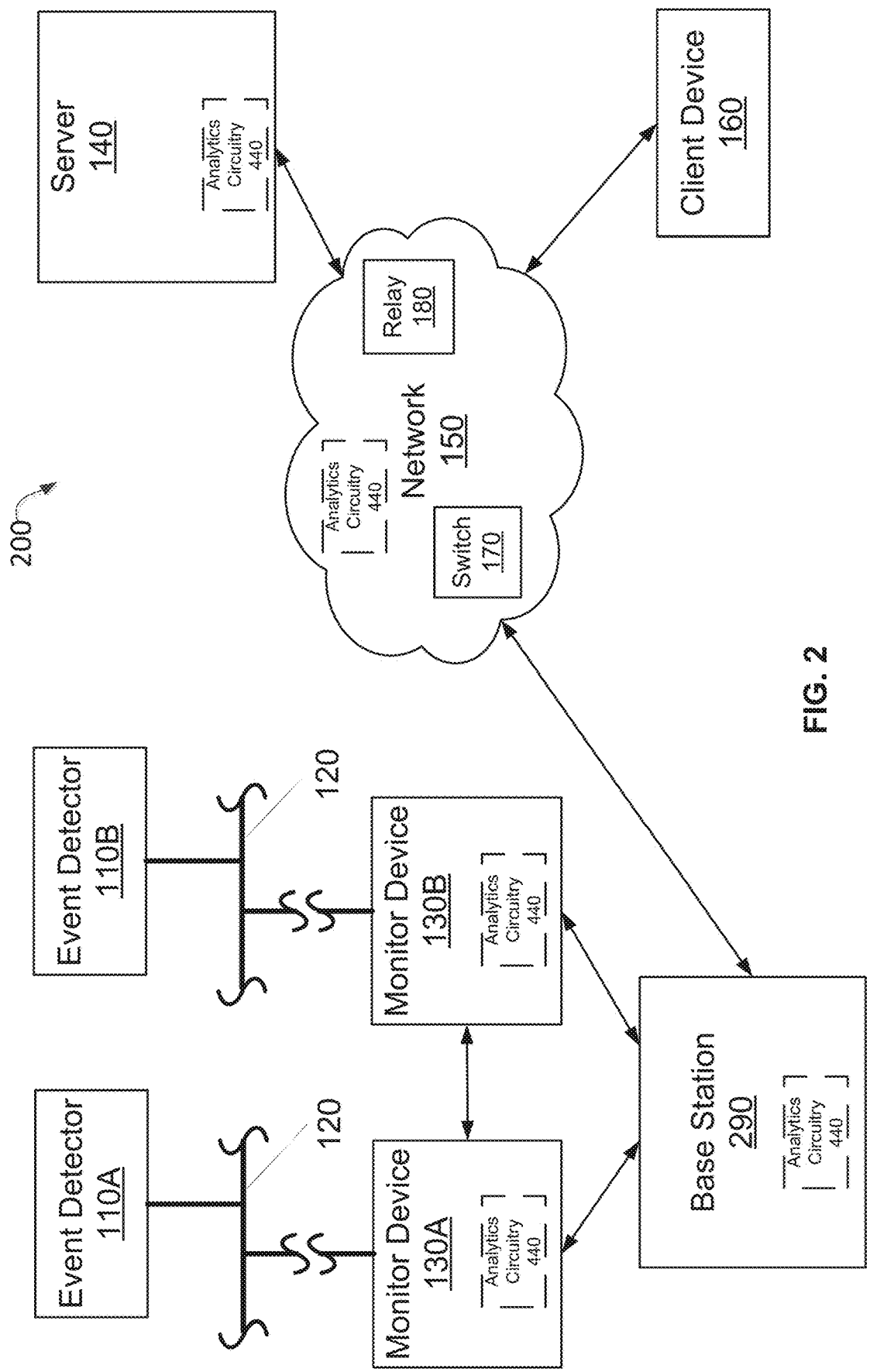
FIG. 2 depicts an example operational environment for implementing aspects of the present invention.

FIG. 2 depicts an operational environment for implementing aspects of the present invention is depicted and referenced generally by designator 200. For instance, base station 290 may implement methods 700 and 800 of FIGS. 7 and 8, respectively. In an embodiment, the components of operation environment 200 operate in a similar manner as the components of operation environment 100 unless indicated otherwise. Event detectors 110A and 110B are interconnected via a common physical medium (common interconnect 120) that is adapted to propagate interconnect signals among the event detectors. In operational environment 200, base station 290, server 140, and client device 160 are configured to communicate data via network 150. In an embodiment, the event detectors (110A and 110B) as well as the monitor devices are incapable of communicating data via network 150.

Base station 290 and one or more monitor devices (e.g. monitor devices 130A and/or 130B) communicate data via communication links 295. In an embodiment, the one or more monitor devices are communicatively coupled via a communication link 295. Communication links 295 each represent one or more bidirectional communication paths that communicatively couple the one or more monitor devices and/or base station 290. In an embodiment, communication link 295 includes at least one wireless link governed by a wireless communication protocol. Examples of such wireless communication protocols include Wi-Fi, Zigbee, Z-Wave, Bluetooth, Bluetooth Low Energy, Near-Field Communications, and the like. In an embodiment, communication link 295 includes at least one wired link governed by a wired communication protocol. Examples of such wired communication protocols include Ethernet, ATM, Token Ring, FDDI, and the like. In an embodiment, communication link 295 includes a telecommunication link governed by a telecommunication protocol. Examples of such telecommunication protocols include CDMA, EvDO, GPRS, TDMA, GSM, WiMax technology, LTE, LTE Advanced, and the like.

Base station 290, in general, serves as an end access point for remote clients (e.g. server 140 or client device 160) to consume information associated with interconnect data via network 150. In operational environment 200, a remote client establishes a communication session with a network interface of base station 290. Base station 290 and the remote client exchange communications regarding interconnect data within the communication session. For example, base station 290 may receive an alert instruction from a remote client within a communication session via the network interface. As another example, base station 290 may communicate a status report associated with one or more of the event detectors to the remote client within the communication session via the network interface.

Base station 290 receives information associated with interconnect data for remote clients to consume using data received from one or more monitor devices. Similar to monitor device 130 of FIG. 1, the one or more monitor devices of operational environment 200 monitor interconnect signals propagating on a common interconnect coupling one or more event detectors. In an embodiment, the monitor devices analyze the interconnect signals propagating on the common interface and the data received by base station 290 is any combination of interconnect data and interconnect metadata.

In an embodiment, the one or more monitor devices do not analyze the interconnect signals propagating on the common interface and the data received by base station 290 is raw data representing the interconnect signals. In an embodiment, base station 290 generates any combination of interconnect data and interconnect metadata based in part on its own analysis of the raw data. In an embodiment, base station 290 generates any combination of interconnect data and interconnect metadata based in part on its own analysis of the raw data and secondary data received from a second monitor device (e.g. monitor device 130B). In an embodiment, base station 290 generates any combination of interconnect data and interconnect metadata based in part on its own analysis of the raw data and secondary data received from a sensor not associated with the one or more monitor devices.

In an embodiment, at least two monitor devices among the multiple monitor devices are interfaced with different event detectors. In an embodiment, at least two monitor devices among the multiple monitor devices are interfaced with different common interconnects. In an embodiment, base station 290 provides computing resources to the one or more monitor devices. Examples of such computing resources include processing resources, communication resources, storage resources, or a combination thereof. For example, base station 290 may provide monitor device 130A with storage resources to store historical data associated with the interconnect signals propagating along the common interconnect. As another example, base station 290 may provide monitor device 130B with communication resources to directly communicate with client device 160 (or vice versa).

Figure 3:
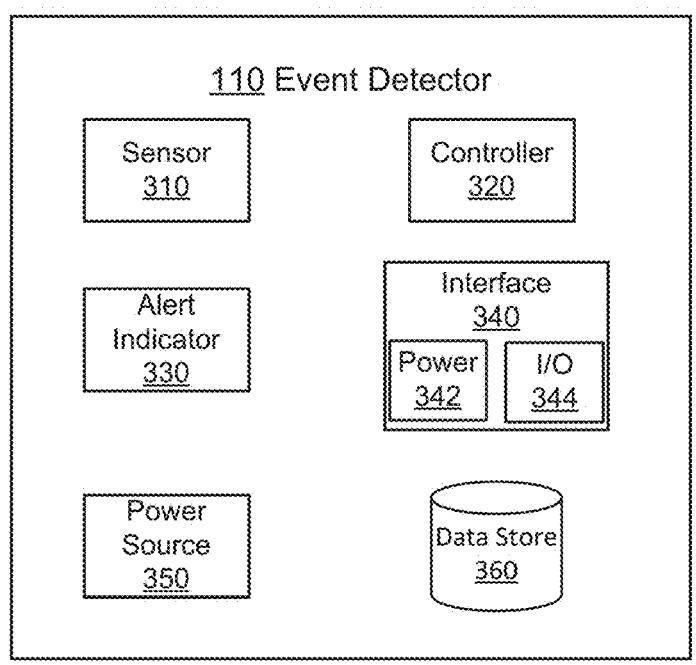
FIG. 3 depicts an example of an event detector usable with aspects of the present invention.

FIG. 3 depicts an example of an event detector 110 suitable to implement the functionalities described above with respect to event detector 110 of FIG. 1. As illustrated by the embodiment depicted in FIG. 3, event detector 110 includes sensor 310, controller 320, alert indicator 330, and interface 340. In an embodiment, event detector 110 also includes internal power source 350, data store 360, or a combination thereof.

Sensor 310 is configured to measure a physical quantity associated with a physical environment proximate event detector 110. Upon measuring the physical quantity, sensor 310 converts the physical quantity into sensor data representative of the physical quantity. Examples of sensor 310 include an electrical sensor, an electrochemical sensor, a tactile sensor, a photoelectric sensor, a pressure sensor, a pyroelectric sensor, a fluid velocity sensor, a radiation sensor, a mechanical variation sensor, and the like. In an embodiment, event detector 110 includes a plurality of sensors with two or more sensors among the plurality of sensors being configured to measure different physical quantities associated with an environment proximate to event detector 110.

Controller 320 is generally configured to detect one or more events associated with a physical environment proximate a location of event detector 110 based on sensor data provided by one or more sensors (e.g. sensor 310). In an embodiment, controller 320 is configured to detect an event by executing a custom application stored in memory (e.g. data store 360) communicatively coupled to controller 320. Responsive to detecting an event, controller 320 is configured to generate an interconnect signal indicative of the detected event. In an embodiment, controller 320 is configured to generate a plurality of unique interconnect signals with each unique interconnect signal among the plurality corresponding to a particular detected event.

Controller 320 forwards the interconnect signal to one or more alert indicators (e.g. alert indicator 330) to generate a sensory notification. In an embodiment, controller 320 is configured to select a particular alert indicator among the one or more alert indicators to forward the interconnect signal. Controller 320 is further configured to forward the interconnect signal via interface 340 to a common physical medium (e.g. common interconnect 120 of FIG. 1). As discussed above with respect to FIG. 1, the common physical medium couples event detector 110 with one or more event detectors. By forwarding the interconnect signal to the common physical medium, controller 320 enables at least one event detector to likewise generate a sensory notification to indicate detection of an event.

Alert indicator 330 is configured to generate the sensory notification in response to receiving an interconnect signal from controller 320. For example, event detector 110 may be a smoke event detector. In this embodiment, alert indicator 330 may generate a conventional smoke alarm sound in response to receiving an interconnect signal indicative of a detected smoke event. In an embodiment, alert indicator 330 is configured to generate a sensory notification in response to event detector 110 receiving an interconnect signal via interface 340. In an embodiment, alert indicator 330 is configured to generate a multi-sensory notification capable of being perceived by a plurality of the observer's senses. For example, a multi-sensory notification may be implemented as a combination of optical and acoustic waves. A sensory notification is characterized by one or more attributes, such as a frequency, a duty cycle, an amplitude, a periodicity, and the like. In an embodiment, a sensory notification includes a message component that provides specific information about a detected event. For example, if event detector 110 is a smoke event detector, the sensory notification may include a message component stating that smoke has been detected in the specific location of the smoke event detector. Continuing with this example, the message component may further provide routing information to enable an observer to identify a safe means of egress.

Interface 340 is configured to couple event detector 110 to an external power source and other event detectors. As illustrated by FIG. 3, interface 340 includes power interface 342 and input/output ("I/O") interface 344. Power interface 242 is configured to operatively couple event detector 110 with an external power source thereby enabling event detector 110 to receive electrical energy from the external power source. I/O interface 344 is configured to communicatively couple event detector 110 with the common physical medium. I/O interface 344 thereby enables propagation of the interconnect signals between event detector 110 and the one or more interconnected event detectors via the common physical medium. In an embodiment, interface 340 is a standard three-wire interconnect. In an embodiment, interface 340 includes components that perform signal conditioning operations that modify the interconnect signals propagating through I/O interface 344. Examples of signal conditioning operations include amplification, filtering, isolation, conversion, and the like.

In an embodiment, event detector 110 includes internal power source 350 that provides electrical energy to event detector 110. In an embodiment, internal power source 350 serves as a primary source of electrical energy for event detector 110. In an embodiment, internal power source 350 serves as an auxiliary power source for event detector 110. In an embodiment, internal power source 350 stores electrical energy received via power interface 342.

In an embodiment, event detector 110 includes data store 360 providing internal data storage capabilities to event detector 110. In an embodiment, a custom application configuring controller 320 to detect an event is stored in data store 360. In an embodiment, data store 360 aggregates at least one dataset composed of historical data associated with event detector 110, such as sensor data, interconnect signals, alert signals, and the like. In an embodiment, data store 360 stores metadata associated with sensor data, interconnect signals, alert signals, or a combination thereof. For example, metadata may include a timestamp, location data, source identifying information, sampling intervals, sensor data type, and the like.

Figure 4:
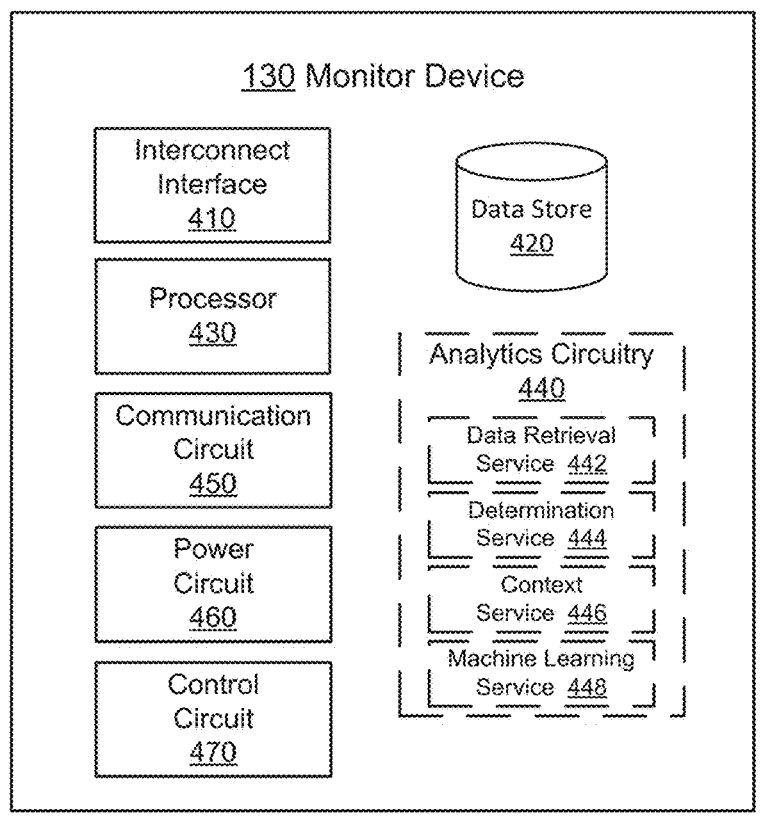
FIG. 4 depicts an example of a monitor device in accordance with aspects of the present invention.

Turning to FIG. 4, an example of a monitor device 130 suitable for implementing embodiments of the present disclosure is depicted. In an embodiment, monitor device 130 is suitable to implement the functionalities described above with respect to monitor device 130 of FIG. 1. As shown, monitor device 130 includes interconnect interface 410, data store 420, processor 430, analytics circuitry 440, communication circuitry 450, power circuitry 460, and control circuitry 470. In an embodiment, monitor device 130 includes a subset of components depicted in FIG. 4. For example, in some embodiments monitor device 130 may be implemented without actuator 470.

Interconnect interface 410 is configured to interface monitor device 130 with a common interconnect to monitor interconnect signals associated with one or more event detectors (e.g. event detector 110 of FIG. 1). In an embodiment, interconnect interface 410 is configured to directly interface monitor device 130 with the common interconnect. In an embodiment, interconnect interface 410 is configured to indirectly interface monitor device 130 with the common interconnect. In an embodiment, monitor device 130 interfaces with secondary data sources via interconnect interface 410 to obtain secondary data usable to generate interconnect metadata.

Data store 420 is configured to provide internal data storage capabilities to monitor device 130. In an embodiment, interconnect signals obtained via interconnect interface 410 are stored locally by monitor device 130 in data store 420. In an embodiment, data store 420 aggregates at least one dataset composed of historical data associated with interconnect signals monitored by monitor device 130, such as previously obtained interconnect signals, secondary data, and the like. In an embodiment, data store 420 stores metadata associated with sensor data, interconnect signals, alert signals, or a combination thereof. Examples of such metadata include a timestamp, location data, source identifying information, sampling intervals, sensor data type, and the like.

Processor 430 is generally configured to execute processor executable instructions, data structures, program modules and other data tangibly stored in computer storage media (e.g. data store 420) communicatively coupled to monitor device 130. In an embodiment, processor 430 enables monitor device 130 to implement one or more functionalities described herein by executing such processor executable instructions. For example, processor 430 may execute processor executable instructions to instantiate one or more functionalities associated with analytics circuitry 440.

It should be appreciated by those skilled in the art that the functionality of monitor device 130 implemented through processor executable instructions may readily be converted into a hardware implementation by well-known design rules in the electrical engineering and software engineering arts. For example, the functionality of monitor device 130 described herein can be converted into a hardware implementation using application-specific integrated circuits, microcontrollers, field programmable gate arrays, digital signal processors, and the like. Those skilled in the art will likewise recognize that the functionality of monitor device 130 may readily be implemented through a hybrid approach composed of combination of hardware and software techniques.

Analytics circuitry 440 is generally configured to analyze data associated with interconnect signals obtained by monitor device 130 from a common interconnect. Analytics circuitry 440 includes data retrieval service 442, inference service 444, context service 446, and context service 448. In an embodiment, one or more of the functionalities of analytics circuitry 440 are implemented by at least one processor of a base station (e.g. base station 290 of FIG. 2). In an embodiment, one or more functionalities of analytics circuitry 440 are implemented by at least one processor of a remote server (e.g. server 140 of FIG. 1 or cloud-based server 900 of FIG. 9).

Data retrieval service 442 is configured to retrieve data associated with the interconnect signals as directed by processor 430, and provide such data to the other services of analytics circuitry 440 for further processing. In an embodiment, data retrieval service 442 retrieves at least a portion of the data from data store 420. In an embodiment, data retrieval service 442 retrieves at least a portion of the data from interconnect interface 410. In an embodiment, data retrieval service 442 is configured to retrieve secondary data associated with the interconnect signals from interconnect interface 410.

Inference service 444 is configured to receive input data associated with interconnect signals from data retrieval service 442, machine learning service 448, or a combination thereof and generate interconnect data. Inference service 444 outputs the interconnect data to a network interface via communication circuitry 450. In an embodiment, inference service 444 determines one or more characteristics of an interconnect signal associated with an event detector using input data received from data retrieval service 442. As used herein, "characteristics of an interconnect signal" refers to measurable physical properties of the interconnect signal. For example, measurable physical properties may include electrical properties (e.g. resistance, reactance, voltage, current, phase, resonant frequency, etc.) or observable patterns (e.g. a repeated sequence of changes in the electrical properties). For example, inference service 444 may compare a voltage associated with an interconnect signal at a current time to a voltage value associated with the interconnect signal at a prior time. As another example, inference service 444 may identify a repeated pattern of phase shifts associated with an interconnect signal.

In an embodiment, the input data from data retrieval service 442 includes information associated with the interconnect signals provided by a second monitor device (e.g. monitor device 130B of FIG. 2). Inference service 444 may generate interconnect data by comparing one or more characteristics of the interconnect signals from the information provided by the second monitor device with comparable information as measured by monitor device 130. For example, inference service 444 may compare a current value of an interconnect signal as provided by the second monitor device with a current value of the interconnect signal as measured by monitor device 130. Inference service 444 may generate interconnect data based on the results of that comparison.

In an embodiment, inference service 444 may generate interconnect data by applying information associated with an interconnect signal received from data retrieval service 442 as an input to a machine learned model received from machine learning service 446. For example, inference service 444 may input information associated with an interconnect signal at a current time from data retrieval service 442 into a machine learned model trained using previously obtained information associated with the interconnect signal. The machine learned model may generate interconnect data based on that input.

In an embodiment, the information output by inference service 444 is information about at least one event detector's alarm status. For example, inference service 444 may determine an event detector's alarm status is activated. That is, the event detector has detected an event associated with a physical environment proximate a location of the event detector. As another example, inference service 444 may determine an event detector's alarm status is inactivated. That is, the event detector has not detected an event associated with a physical environment proximate a location of the event detector.

In an embodiment, the information output by inference service 444 is information about at least one event detector's operational status. For example, inference service 444 may determine an event detector's operational status is fully functional. That is, inference service 444 may determine the event detector is functioning properly (e.g. the event detector is fully powered or substantially operating without apparent fault).

As another example, inference service 444 may determine an event detector's operational status is degraded. That is, inference service 444 may determine the event detector is functioning less than fully functional, but more than non-functional (e.g. the event detector is not fully powered or operating with apparent faults). As another example, inference service 444 may determine an event detector's operational status is non-functional. That is, inference service 444 may determine the event detector has ceased functioning (e.g. the event detector lost power or ceased operating).

In an embodiment, the information output by inference service 444 is identifying information about at least one event detector. As discussed above, examples of identifying information include the event detector's manufacturer, model number, configuration, and the like. For example, inference service 444 may compare one or more characteristics of an interconnect signal associated with an event detector at a current time with an interconnect signal associated with the event detector at a prior time.

As another example, inference service 444 may compare one or more characteristics of an interconnect signal associated with a first event detector at a current time with an interconnect signal associated with a second event detector. In an embodiment, the interconnect signal associated with the second event detector is from the current time. In an embodiment, the interconnect signal associated with the second event detector is from a prior time.

As another example, inference service 444 may compare one or more characteristics of an interconnect signal associated an event detector at a current time with a model interconnect signal. In an embodiment, the model interconnect signal is obtained from a machine learned model trained with historical data associated with the event detector. In an embodiment, the model interconnect signal is obtained from a machine learned model trained with historical data associated a plurality of event detectors. In an embodiment, the model interconnect signal is received via a network interface.

Context service 446 is configured to receive input data from data retrieval service 442, inference service 444, or a combination thereof and generate interconnect metadata. In an embodiment, context service 446 is configured to utilize a machine learned model received from machine learning service 448 to generate interconnect metadata. In an embodiment, context service 446 is configured to generate interconnect metadata by analyzing data collected from a plurality of devices (e.g. monitor devices, event detectors, etc.).

In an embodiment, context service 446 generates interconnect metadata using secondary data received from data retrieval service 442 in response to receiving interconnect data from inference service 444. For example, inference service 444 may generate interconnect data for an event detector (e.g. a smoke detector) at a current time. In this example, the interconnect data may indicate that the event detector's alarm status is activated (i.e. the event detector has detected an event proximate its location). Upon receiving the interconnect data, context service 446 acquires sensor data from a temperature sensor external to the event detector at a location proximate to the event detector at the current time. Context service 446 may generate interconnect metadata indicative of the sensor data associated with the interconnect data.

Continuing with this example, the sensor data from the temperature sensor may indicate that a temperature of the location is normal room temperature. Context service 446 may further generate a low confidence value upon receiving sensor data from a sensor external to the event detector that is inconsistent with the detected event. Context service 446 may generate interconnect metadata indicative of the low confidence value associated with the interconnect data. As another example, context service 446 may receive interconnect data generated by inference service 444 based in part on interconnect signals. Upon receiving the interconnect data, context service 446 acquires time stamp information from data retrieval service 442 to determine a current time. In this example, the sensor data from the temperature sensor may indicate that a temperature of the location is normal room temperature.

In an embodiment, context service 446 generates interconnect metadata using historical data received from data retrieval service 442 in response to receiving interconnect data from inference service 444. For example, context service 446 may receive interconnect data for an event detector at a current time from inference service 444. In response, context service 446 may acquire historical data associated with the event detector from data retrieval service 442. Upon analyzing the historical data associated with the event detector, context service 446 may determine that the previous events detected by the event detector were identified as false alerts. Context service 446 may generate interconnect metadata indicative of the event detector's history of false alerts associated with the interconnect data.

In an embodiment, context service 446 generates interconnect metadata directly from interconnect data received from inference service 444. For example, context service 446 may receive interconnect data for an event detector that indicates the event detector's alarm status is activated and operational status is degraded. In response, context service 446 may generate interconnect metadata indicative of the degraded operational status of the event detector for the interconnect data. In an embodiment, a reduced confidence score may be used to indicate the degraded operational status.

Machine learning service 448 is configured to train machine learned models using training data obtained from data sets composed of historical interconnect signal data received from data retrieval service 442. Once trained, the machine learned models may be used by inference service 444 and/or context service 446 to generate interconnect data and interconnect metadata, respectively. Machine learning service 448 may employ any known artificial intelligence, machine learning, knowledge-based, or rule-based mechanisms to train machine learned models. Examples of such mechanisms include support vector machines, neural networks, expert systems, Bayesian belief networks, fuzzy logic, data fusion engines, classifiers, and the like.

In training the machine learned models (e.g. find optimal values of for model parameters), machine learning service 448 may use an objective function to measure the performance of the models using a subset of the training data as a function of the model parameters. For example, optimal values of the parameters of a model may be determined by finding a minimum of the objective function. As another example, multiple iterations of a stochastic gradient descent procedure may be performed to find the optimal values of the parameters. In an embodiment, the machine learning model is composed of a single level of linear or non-linear operations. In an embodiment, the machine learning model is a deep network composed of multiple levels of non-linear operations. For example, the machine learning model may be a neural network with one or more hidden layers.

Communication circuitry 450 is configured to communicatively couple monitor device 130 with the one or more connected devices (e.g. monitor device 130A, monitor device 130B, server 140, client device 160, and base station 290 of FIGS. 1-2). Examples of devices usable to implement communication circuitry 450 include a network interface controller, a modem, various modulators/demodulators and encoders/decoders, wireless interface cards, wired interface cards, antennas, and the like. Monitor device 130 may utilize communication circuitry 450 to exchange data (e.g. interconnect data, interconnect metadata, and raw data) with one or more connected devices.

Power circuitry 460 includes various hardware and software configurations that operatively couples one or more components of monitor device 130 to a power source. As used herein, "coupled" includes direct coupling and indirect coupling via another component, element, circuit, or module. For example, power circuitry 460 may be hard wired to a power source or directly coupled to a power plug that is in turn inserted into a corresponding component of the power source. In embodiments where indirect coupling is used, the intervening component, element, circuit, or module may adjust a current level, a voltage level, and/or a power level associated with the power source. For example, an inductive coupling device may intervene between power circuitry 460 and the power source. As another example, a capacitive coupling device may intervene between power circuitry 460 and the power source.

In an embodiment, the power source is an internal power source. Examples of internal power sources include a battery, a storage capacitor, a small-scale energy source (e.g. piezoelectric, magnetic induction, or thermoelectric generators, energy harvesting devices, and the like. In an embodiment, the power source is an external power source. Examples of external power sources include one or more event detectors, power lines associated with a common interconnect coupled to the one or more event detectors, an AC power outlet, a power storage device (e.g. a battery) proximate monitor device 130's location, an energy harvesting device, and the like.

Control circuitry 470 is exchange data with a controlling mechanism that manages, commands, directs, or regulates another device thereby causing that device to take defined actions. Examples of controlling mechanisms include programmable logic controllers, microcontrollers, distributed control systems, home automation hubs, and the like.

In an embodiment, control circuitry 470 exchanges data with a controlling mechanism in response to a command from a remote client received via a network interface. For example, a command may be received from a remote client (e.g. server 140 or client device 160 of FIG. 1) via a network interface to turn off a gas valve. The command may be received in response to transmitting interconnect data to the remote client that indicates a smoke detector's alarm status is activated. Upon receiving the command, control circuitry 470 may exchange data with a controlling mechanism associated with the gas valve thereby causing the gas valve to move to a closed position.

In an embodiment, control circuitry 470 exchanges data with a controlling mechanism in response to a command from processor 430, a second monitor device, a base station associated with monitor device 130, or a combination thereof. For example, a base station may receive interconnect data indicating that an event detector associated with an electrical power feed has detected a loss of power event. Upon receiving that interconnect data, the base station may send a command to activate an electrical generator. In response to that command, control circuitry 470 may exchange data with a controlling mechanism associated with the electrical generator to activate the electrical generator.

Figure 5:
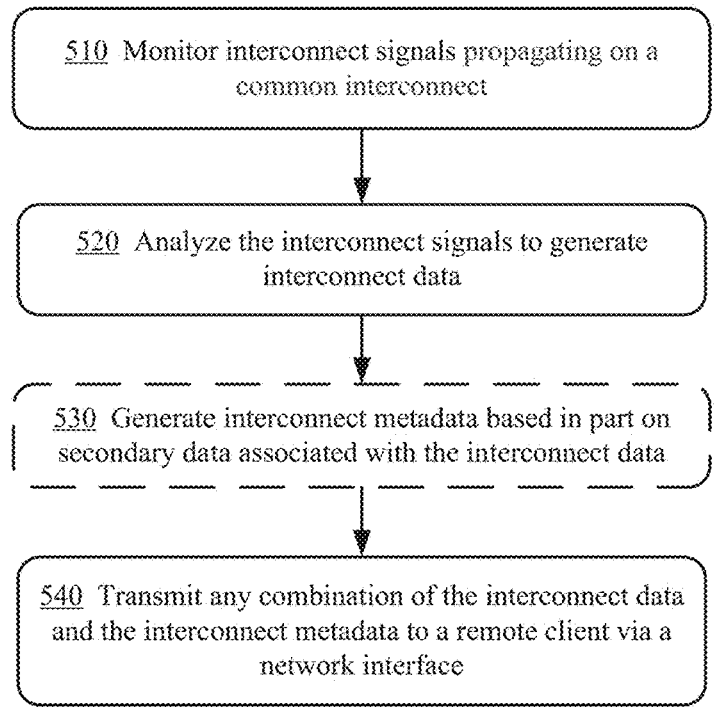
FIG. 5 depicts an embodiment of a method for interfacing event detectors with a network interface.

FIG. 5 is a flowchart illustrating an embodiment of a method 500 for interfacing event detectors with a network interface. Method 500 may be performed by a monitor device (e.g. monitor device 120 of FIG. 1) interfaced with a common interconnect coupled to one or more event detectors. At step 510, the monitor device monitors signals associated with a first event detector propagating on the common interconnect. In an embodiment, the monitor device is directly interfaced with the common interconnect. In an embodiment, the monitor device is indirectly interfaced with the common interconnect and thereby electrically isolated from the one or more event detectors.

At step 520, the monitor device analyzes the signals propagating on the common interconnect to generate interconnect data. As discussed above, the interconnect data being information about event detectors that the monitor device infers, in part, from the signals propagating on the common interconnect. In an embodiment, the interconnect data includes information about the first event detector's alarm status. In an embodiment, the interconnect data includes information about the first event detector's operational status. In an embodiment, the interconnect data includes identifying information about the first event detector.

At optional step 530, the monitor device generates interconnect metadata based at least in part on secondary data associated with the interconnect data. In an embodiment, the interconnect metadata includes signals associated with a second event detector propagating along the common interconnect. In an embodiment, the interconnect metadata includes time stamp information associated with the interconnect data. In an embodiment, the interconnect metadata includes sensor data provided by sensors unassociated with the first event detector. In an embodiment, the interconnect metadata includes a confidence value associated with current interconnect data derived from previous interconnect data.

At step 540, the monitor device communicates any combination of the interconnect data and the interconnect metadata via a network interface to a remote client. In an embodiment, the remote client is a service executing on a remote server. In an embodiment, the remote server is a cloud-based server. In an embodiment, the remote client is a service executing on a client device. In an embodiment, the monitor device communicates any combination of interconnect data and interconnect metadata on a continuous basis. In an embodiment, the monitor device communicates any combination of interconnect data and interconnect metadata on a periodic basis. In an embodiment, the monitor device receives a predefined interval for the periodic basis from the remote client. In an embodiment, the monitor device communicates any combination of interconnect data and interconnect metadata upon determining a predefined criterion is met. In an embodiment, the monitor device communicates any combination of interconnect data and interconnect metadata in response to a request from the remote client.

Figure 6:
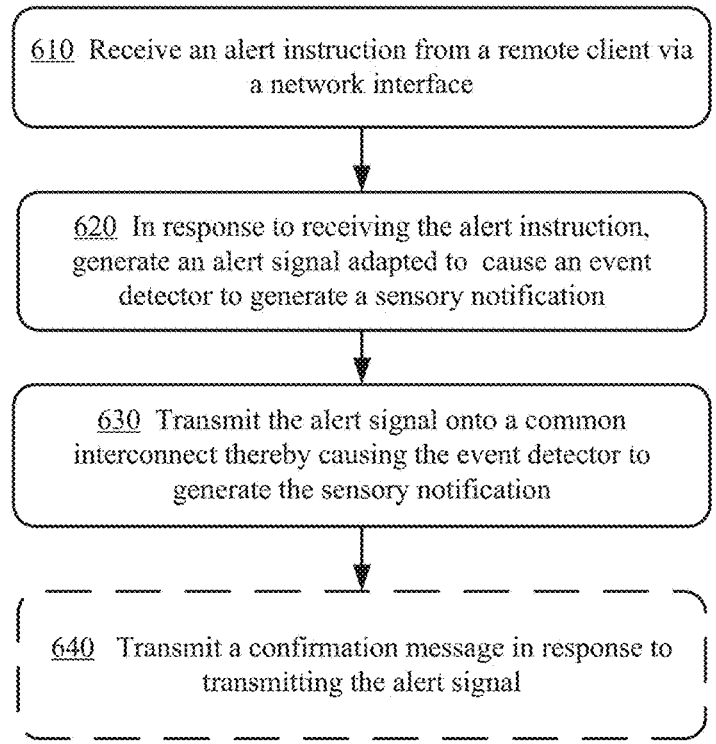
FIG. 6 depicts another embodiment of a method for interfacing event detectors with a network interface.

FIG. 6 is a flowchart illustrating an embodiment of a method 600 for interfacing event detectors with a network interface. Method 600 may be performed by a monitor device (e.g. monitor device 120 of FIG. 1) interfaced with a common interconnect coupled to one or more event detectors. At step 610, the monitor device receives an alert instruction from a remote client via a network interface. The alert instruction of step 610 is associated with a request to cause at least one event detector among the one or more event detectors to generate a sensory notification. In an embodiment, the alert instruction is unassociated with an event a first event detector is configured to detect. For example, the first event detector may be a motion detector configured to detect a motion event. In this example, the alert instruction may be associated with a fire emergency event, which is unassociated with the motion event the first event detector is configured to detect. In an embodiment, the alert instruction is directed to a subset of the one or more event detectors.

At step 620, in response to receiving the alert instruction, the monitor device generates an alert signal adapted to cause the first event detector to generate a sensory notification. In an embodiment, the monitor device generates the alert signal based in part on monitoring signals associated with the one or more event detectors propagating on a common interconnect. In an embodiment, the monitor device generates the alert signal based in part on monitoring signals identified as being associated with the first event detector. In an embodiment, the alert signal is adapted to cause the first event detector to generate a multi-sensory notification. In an embodiment, the alert signal specifies at least one attribute characterizing the sensory notification. In an embodiment, the alert signal specifies a message component to be included in the sensory notification by the first event detector. In an embodiment, the monitor device generates an alert signal adapted to cause a subset of the one or more event detectors to generate sensory notifications.

At step 630, the monitor device transmits the alert signal onto the common interconnect coupled to the one or more event detectors. The alert signal of step 630 causing the first event detector to generate a sensory notification in response to receiving the alert signal via the common interconnect. In an embodiment, a second event detector not among the subset of the one or more event detectors refrains from generating sensory notifications in response to receiving the alert signal via the common interconnect.

At optional step 640, the monitor device transmits a confirmation message in response to transmitting the alert signal onto the common interconnect. In an embodiment, the monitor device confirms that the first event detector has generated the sensory notification requested by the remote client prior to transmitting the confirmation message. In an embodiment, the monitor device transmits the confirmation message to the remote client sending the alert instruction. In an embodiment, the monitor device transmits the confirmation message to a remote service associated with the remote client.

Figure 7:
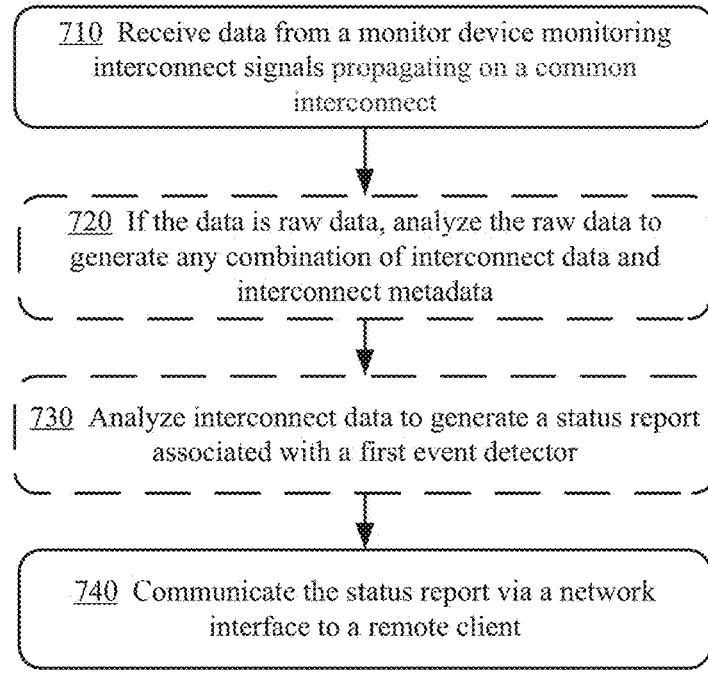
FIG. 7 depicts another embodiment of a method for interfacing event detectors with a network interface.

FIG. 7 is a flowchart illustrating an embodiment of a method 700 for interfacing event detectors with a network interface. Method 700 may be performed by a base station (e.g. base station 290 of FIG. 2) coupled to one or more monitor devices interfaced with a common interconnect coupled to one or more event detectors. At step 710, the base station receives data from a first monitor device among the one or more monitor devices that monitor signals propagating along the common interconnect. In an embodiment, the data is received via a wired connection intervening between the first monitor device and the base station. In an embodiment, the data is received via a wireless connection intervening between the first monitor device and the base station. In an embodiment, the data is raw data sent by the first monitor device without analyzing the interconnect signals. In an embodiment, the data is any combination of interconnect data and interconnect metadata that the first monitor device generates in part by analyzing the signals propagating along the common interconnect.

At optional step 720 when the data is raw data, the base station generates any combination of interconnect data and interconnect metadata based in part on analyzing the raw data. In an embodiment, the base station generates any combination of interconnect data and interconnect metadata based in part on analyzing raw data received from a second monitor device among the one or more monitor devices. In an embodiment, the base station generates any combination of interconnect data and interconnect metadata based in part on analyzing raw data received from a second monitor device. In an embodiment, the raw data received from the second monitor device corresponds to a second event detector among the one or more event detectors. In an embodiment, the base station generates any combination of interconnect data and interconnect metadata based in part on analyzing interconnect data or interconnect metadata associated with the second event detector. In an embodiment, the interconnect data or interconnect metadata associated with the second event detector is generated by the second monitor device.

At step 730, the base station analyzes the interconnect data to generate a status report associated with the first event detector. In an embodiment, the status report includes information about the first event detector's alarm status, information about the first event detector's operational status, identifying information about the first event detector, or a combination thereof. In an embodiment, the status report includes context information derived from interconnect metadata associated with the interconnect data. In an embodiment, the status report includes a confidence value associated with the interconnect data used to generate the status report. In an embodiment, the status report includes information about the operational status of the first monitor device, a subset of the one or more monitor devices, the one or more monitor devices collectively, or a combination thereof.

At step 740, the base station communicates the status report via a network interface to a remote client. In an embodiment, the remote client is a session executing on a remote server. In an embodiment, the remote server is a cloud-computing platform. In an embodiment, the remote client is a mobile client device. In an embodiment, the base station communicates the status report on a continuous basis. In an embodiment, the base station communicates the status report on a periodic basis. In an embodiment, the base station receives a predefined interval for the periodic basis from the remote client. In an embodiment, the base station communicates the status report upon determining a predefined criterion is met. In an embodiment, the base station communicates the status report in response to a request from the remote client.

Figure 8:
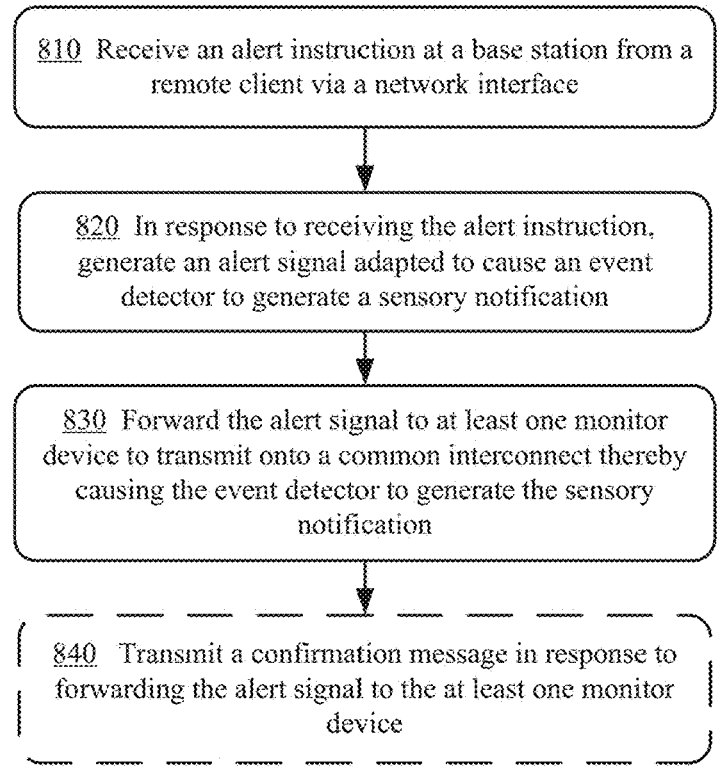
FIG. 8 depicts another embodiment of a method for interfacing event detectors with a network interface.

FIG. 8 is a flowchart illustrating an embodiment of a method 800 for interfacing event detectors with a network interface. Method 800 may be performed by a base station (e.g. base station 290 of FIG. 2) coupled to one or more monitor devices interfaced with a common interconnect coupled to one or more event detectors. At step 810, the base station receives an alert instruction from a remote client via a network interface. The alert instruction of step 810 is associated with a request to cause at least one event detector among the one or more event detectors to generate a sensory notification. In an embodiment, the alert instruction is unassociated with an event a first event detector is configured to detect. In an embodiment, the alert instruction is directed to a subset of the one or more event detectors.

At step 820, in response to receiving the alert instruction, the base station generates an alert signal adapted to cause the at least one event detector to generate a sensory notification. In an embodiment, the base station generates the alert signal based in part on data received from the one or more monitor devices regarding signals associated with the one or more event detectors propagating on a common interconnect. In an embodiment, the base station generates the alert signal based in part on monitoring signals identified as being associated with the at least one event detector. In an embodiment, the alert signal is adapted to cause the at least one event detector to generate a multi-sensory notification. In an embodiment, the alert signal specifies at least one attribute characterizing the sensory notification. In an embodiment, the alert signal specifies a message component to be included in the sensory notification by the at least one event detector. In an embodiment, the base station generates an alert signal adapted to cause a subset of the one or more event detectors to generate sensory notifications.

At step 830, the base station forwards the alert signal to at least one monitor device among the one or more monitoring devices to transmit onto the common interconnect coupled to the one or more event detectors. The alert signal of step 830 causing the at least one event detector to generate a sensory notification in response to receiving the alert signal via the common interconnect. In an embodiment, a second event detector not among the subset of the one or more event detectors refrains from generating sensory notifications in response to receiving the alert signal via the common interconnect.

At optional step 840, the base station transmits a confirmation message in response to forwarding the alert signal to the at least one monitor device. In an embodiment, the base station confirms that the at least one event detector generated the sensory notification requested by the remote client prior to transmitting the confirmation message. In an embodiment, the base station transmits the confirmation message to the remote client sending the alert instruction. In an embodiment, the monitor device transmits the confirmation message to a remote service associated with the remote client.

Figure 9:
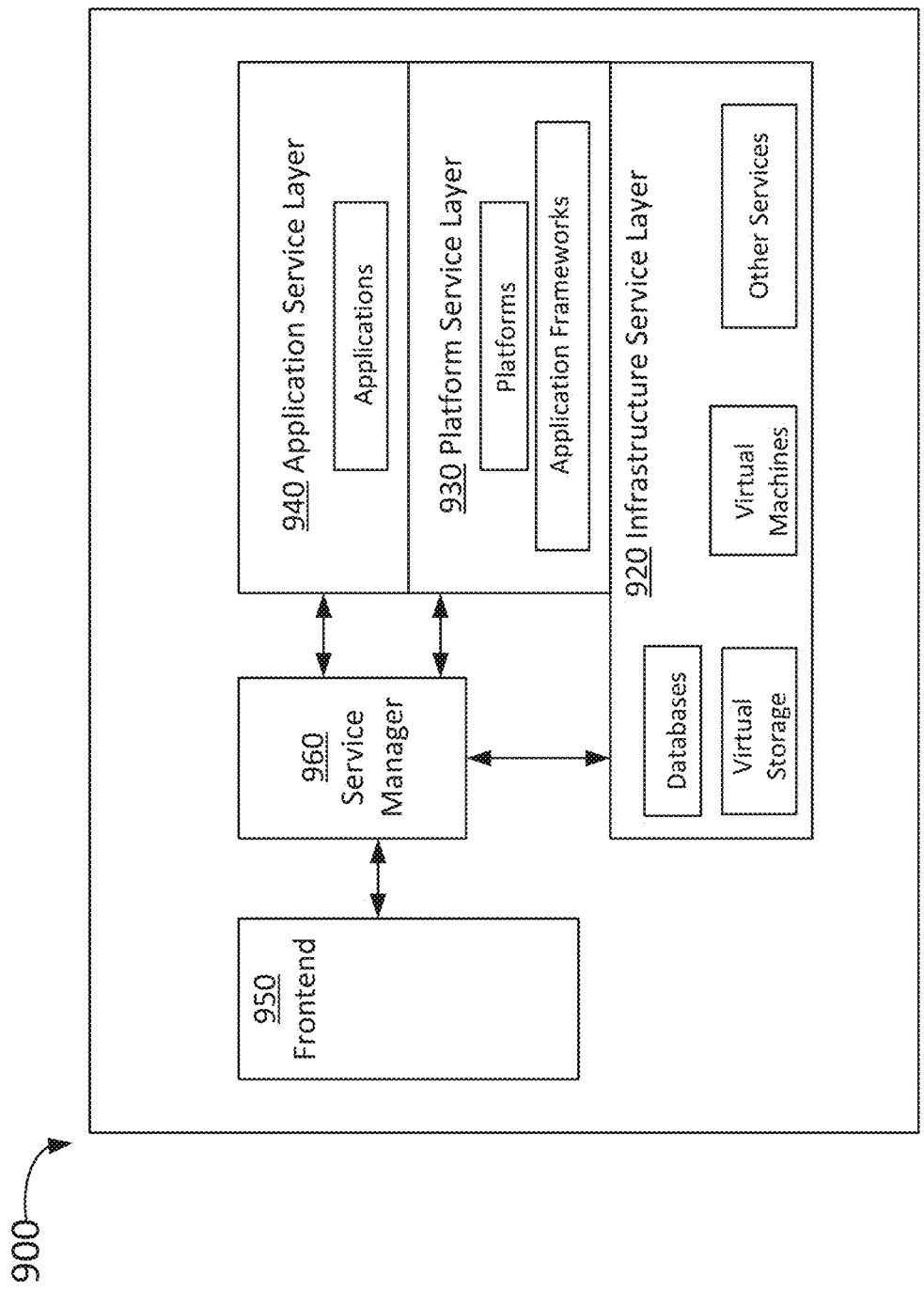
FIG. 9 is a schematic diagram illustrating an example cloud-based server that may be used in accordance with aspects of the present invention.

FIG. 9 is a schematic diagram illustrating an example cloud-based server 900 that may be used in accordance with the present disclosure. As discussed above with respect to FIG. 1, cloud-based server 900 may provide infrastructure services, platform services, and software application services. In an embodiment, cloud-based server 900 is used to implement at least a portion of server 140 in FIGS. 1 and 2. The infrastructure services may include virtualized resources, such as virtual machines, virtual storage, and so on. The infrastructure services may also include virtualized services, such as database services and others. Each of these infrastructure services may be deployed in an infrastructure service layer 920.

The scale and various aspects, such as data, connectivity, and dependency relationships within and between service components, of an infrastructure service deployment are configurable by an administrator user. For instance, the administrator user may submit a configuration specification to cloud-based server 900 via a frontend interface 950 and service manager 960. The configuration specification can be translated into infrastructure and kernel level APIs calls that create, re-create, move, or delete components such as virtual machines and services, and assign or change attributes of the components.

In addition to the infrastructure services, cloud-based server 900 may also provide platform services, such as an environment for running virtual machines or a framework for developing and launching a particular type of software applications. The platform services may be implemented in a platform service layer 930 over the infrastructure service layer #20, and may employ one or more infrastructure services configured in a particular manner. Configuration of platform services can be accomplished by program code written according to the APIs of the platform services and, optionally, the APIs of the infrastructure services that are employed in enabling the platform services.

In some examples, cloud-based server 900 may also provide software application services in an application service layer 940. A software application can be installed on one or more virtual machines or deployed in an application framework in the platform service layer 930. The software application can also communicate with one or more infrastructure service components, such as databases, in the infrastructure layer 920. The installation and configuration of the software application in the application service layer 940 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

Figure 10:
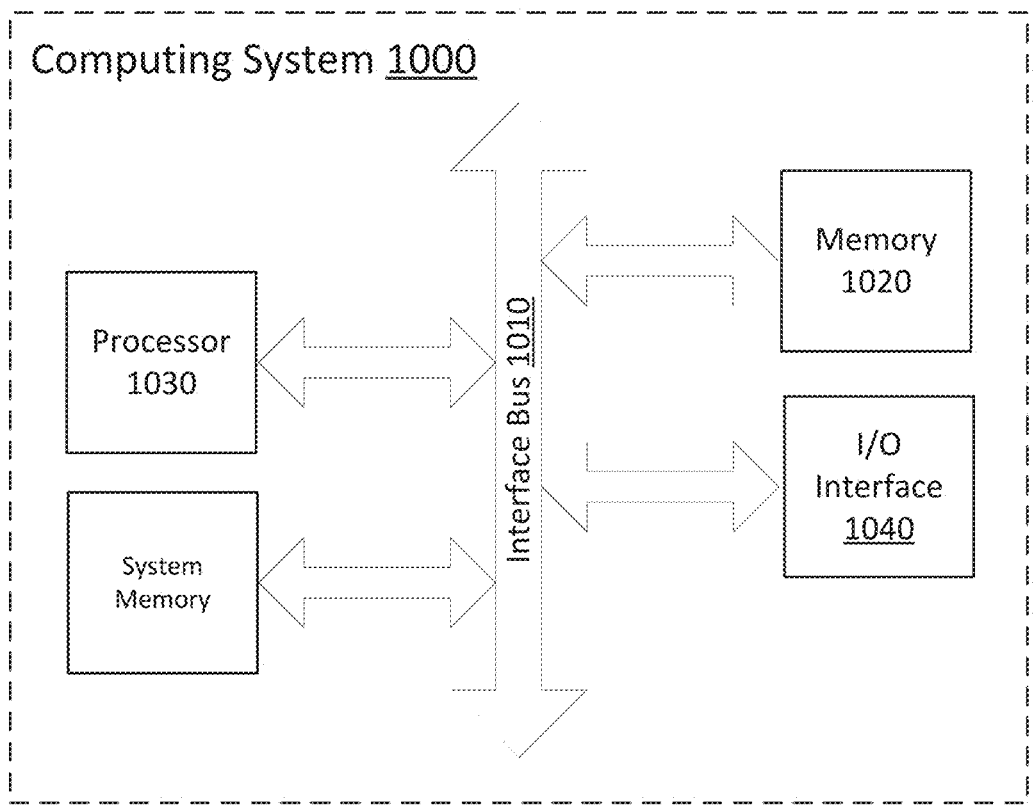
FIG. 10 is a block diagram of an example general purpose computing system in which embodiments of the invention may be implemented.

FIG. 10 is a block diagram of an example general purpose computing system 1000 in which embodiments of the invention may be implemented. As depicted, computing system 1000 includes bus 1010 that directly or indirectly couples the following components: memory 1020, one or more processors 1030, I/O interface 1040, and network interface 1050. Bus 1010 is configured to communicate, transmit, and transfer data, controls, and commands between the various components of computing system 1000

Computing system 1000 typically includes a variety of computer-readable media. Computer-readable media can be any available media that is accessible by computing system 1000 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing system 1000.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 1020 includes computer-storage media in the form of volatile and/or nonvolatile memory. The memory may be removable, non-removable, or a combination thereof. Memory 1020 may be implemented using hardware devices such as solid-state memory, hard drives, optical-disc drives, and the like. Computing system 1000 also includes one or more processors 1030 that read data from various entities such as memory 1020, I/O interface 1040, and network interface 1050.

I/O interface 1040 enables computing system 1000 to communicate with different peripherals, such as a display, a keyboard, a mouse, etc. I/O interface 1040 is configured to coordinate I/O traffic between memory 1020, the one or more processors 1030, network interface 1050, and any peripherals. Network interface 1050 enables computing system 1000 to exchange data with other computing devices (e.g. monitor device 120, server 140, and client device 160 of FIG. 1) via any suitable network (e.g. network 150).

Figure 11:
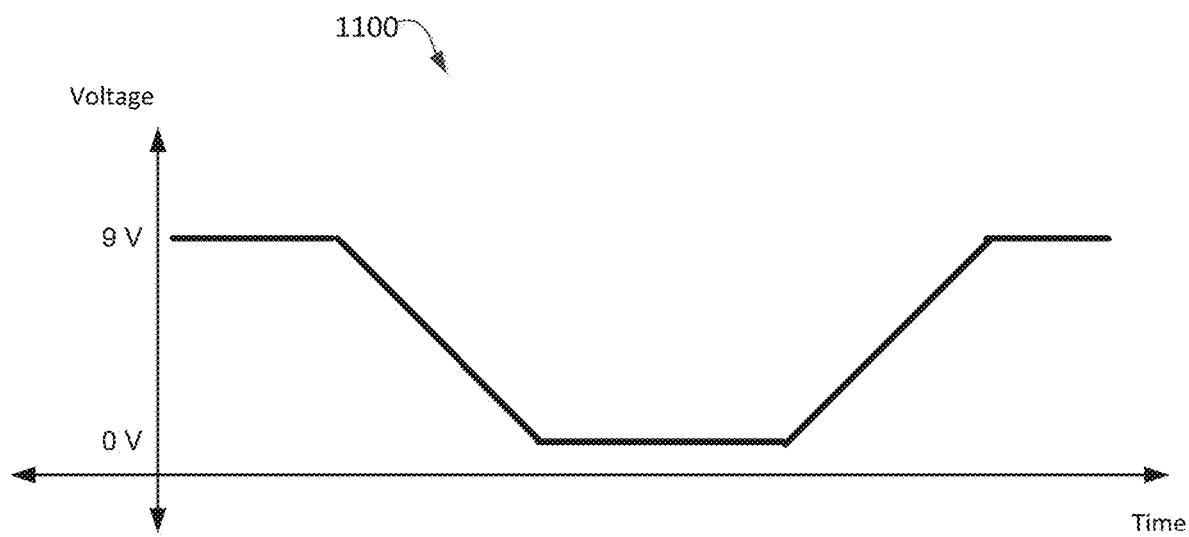
FIG. 11 depicts an example of an interconnect signal propagated on a common interconnect usable with aspects of the present invention.
Figure 12:
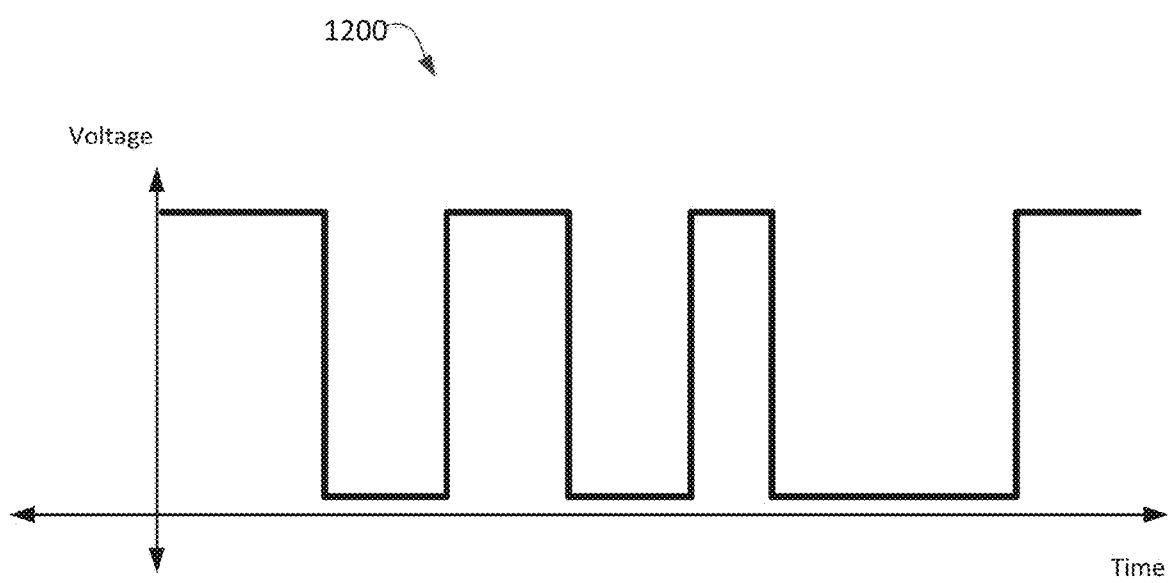
FIG. 12 depicts an example of an interconnect signal propagated on a common interconnect usable with aspects of the present invention.

FIGS. 11-12 depict waveform diagrams of conventional interconnect signals propagated by event detectors on a common interconnect. FIG. 11 depicts an example of an interconnect signal 1100 propagated on a common interconnect by conventional smoke event detectors. A conventional smoke event detector generates an interconnect signal similar to interconnect signal 1100 in response to detecting a smoke event. As shown by FIG. 11, interconnect signal 1100 transitions from a first voltage (e.g. 9 volts DC) to a second voltage (e.g. 0 volts DC) in response to detecting the smoke event. In response to sensing that transition from the first voltage to the second voltage, all conventional smoke event detectors coupled to the common interconnect will generate a sensory notification. Upon receiving an acknowledgement of the smoke event, interconnect signal 1100 transitions from the second voltage to the first voltage.

Figure 13A:
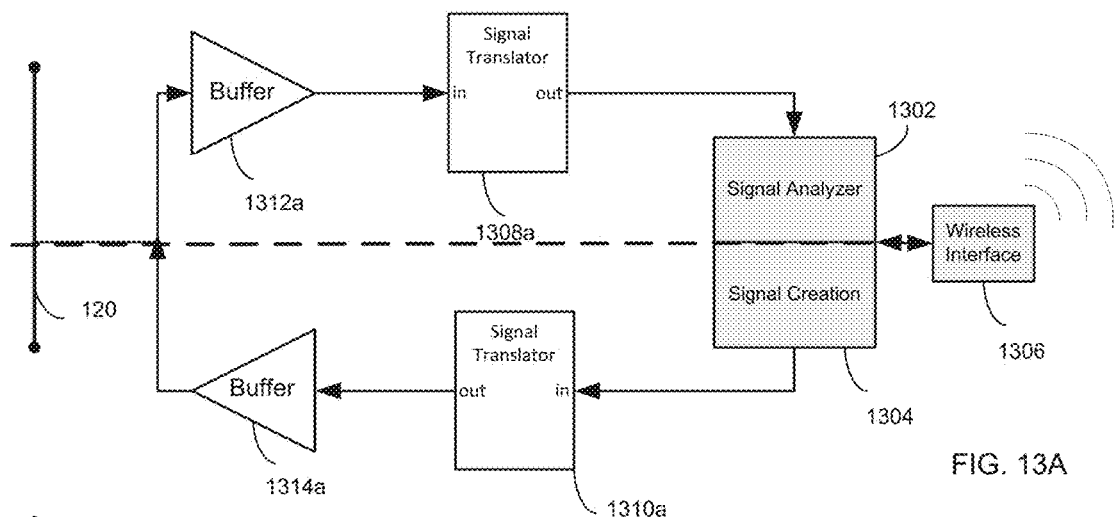
FIGS. 13A-13C depicts various embodiments of aspects of a monitor device that monitors a signal as depicted for example in FIG. 2.
Figure 13B:
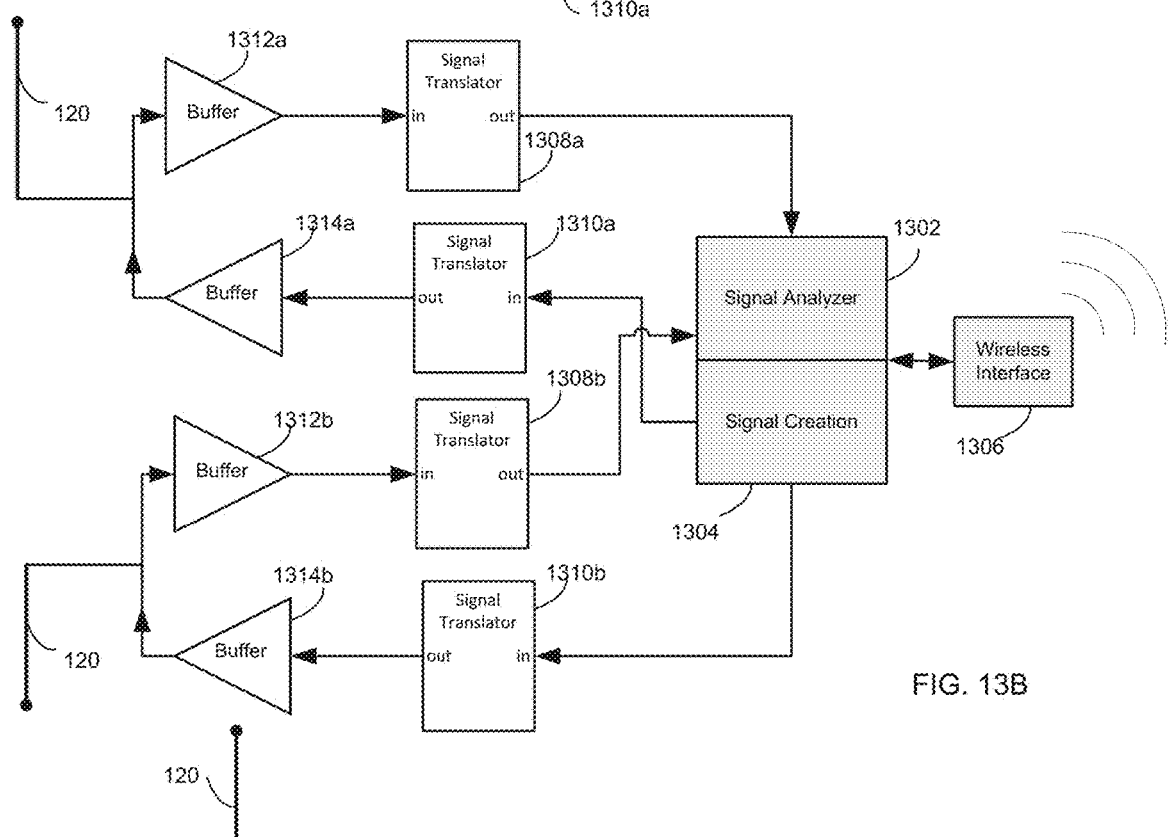
Figure 13C:
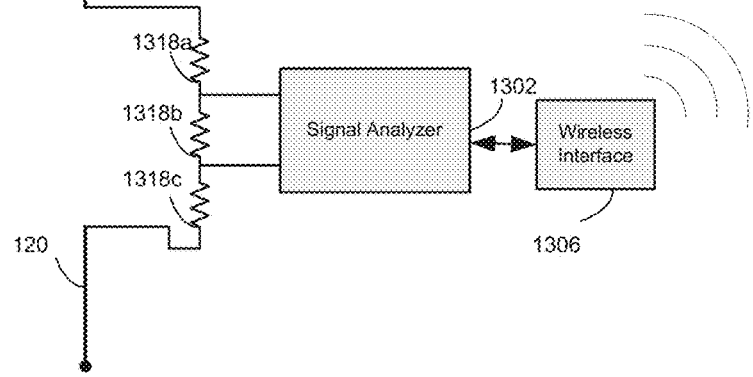

FIG. 12 depicts an example of an interconnect signal 1200 propagated on a common interconnect by conventional carbon monoxide event detectors. A conventional carbon monoxide event detectors generates an interconnect signal similar to interconnect signal 1200 in response to detecting a carbon monoxide event. As shown by FIG. 12, unlike interconnect signal 1100, interconnect signal 1200 indicates detection of a carbon monoxide event with using a sequence of electrical pulses. In response to sensing that sequence of electrical pulses, all conventional carbon monoxide event detectors coupled to the common interconnect will generate a sensory notification. FIGS. 13A-13C depict various embodiments of aspects of a monitor device 130 as described above with respect to FIG. 4. FIG. 13A discloses a circuit connected in parallel to common interconnect 120. In embodiments, the circuit of FIG. 13A has two portions as represented by the dashed line. The top portion is the detecting portion that detects a signal. The bottom portion is a signal injecting portion that injects a signal back onto common interconnect 120. The injected signal can emulate an event signal, e.g., a smoke detection event, or can inject another signal that is processed by the detecting portion to cause, e.g., the detecting portion to take some action such as to send out a signal over wireless transceiver 1306. In other embodiments, a monitor device may only have an event detecting portion and not an injecting portion. In other embodiments, a monitor device may only have an injection portion that monitors for signals incoming over wireless interface 1306 and outputs a signal on the common interconnect 120.

In an embodiment, a signal that is output onto common interconnect 120 by an event detector is received by input buffer 1312a. Buffer 1312a could be an isolation device such as optical isolation, buffer circuitry, analog or digital radio receiver and transmitter. The output from buffer 1312a is input into signal translator 1308a. Signal Translator 1310a could be, for example, a voltage step up/down, radio mixer, an analog to digital convertor, or any other device that translates a signal received on the common interconnect 120 into a signal that can be processed by a signal analyzer 1302. Signal analyzer 1302 can be hardware, e.g., a gate array, or software operating on a processor, such as a digital signal processor. Signal analyzer 1302 determines whether the signal matches a known pattern. In response to determining that a signal matches a known pattern, signal analyzer 1302 can cause a signal to be output over wireless interface 1306. The signal output over 1306 may be a signal that indicates to other devices that an event was detected on a particular common interconnect 120.

In embodiments, another portion of the circuit of FIG. 13A comprises the signal injector portion of the circuit. The signal injector portion comprises a signal creator 1304. Signal creator 1302 could share some or all of the hardware of signal analyzer 1302. For example, they may both reside on the same processor. Signal creator 1304 outputs a signal that is translated by signal translator 1310a. Signal translator may comprise, for example, a digital to analog converter, that outputs an analog signal that is processed by buffer 1314a and injected back onto common interconnect 120.

In another embodiment, as shown in FIG. 13B, the circuit can be installed in series. In that case, buffer 1312a would receive a signal arriving on one portion of the common interconnect 120 and process the signal as described with respect to FIG. 13A. In this embodiment, the common interconnect 120 is not continuous, e.g., it was broken during the installation of the circuit. In this embodiment, the could be a second portion of the circuit comprising, signal translators 1308b, 1310b, buffers 1312b and 1314b. In this configuration, a determination could be made regarding the direction of the signal received on common interconnect 120. Similarly, the direction that the signal is injected onto common interconnect 120 can also be controlled.

In another embodiment, the circuit could comprise passive components. An example embodiment is illustrated with respect to FIG. 13C. In that example embodiment, a series of, e.g., resistors 131ba, 1318b, and 1318c are provided. The signal analyzer 1302 is connected between the resistors and can determine from which direction a signal is arriving. In addition to the foregoing configurations and embodiments, other embodiments may combine aspects of both passive and active components. For example, an active signal injector circuit may be combined with a passive signal detection circuit.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device.

One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A system comprising:
a plurality of event detectors, the plurality of event detectors interconnected via a common interconnect of propagating interconnect signals among the plurality of event detectors, wherein each of the plurality of event detectors comprises a radio frequency detector, at least two optical isolation devices and at least two signal translators;
at least one receiver configured to indirectly couple to the common interconnect, the at least one receiver configured to receive the interconnect signals propagating among the plurality of event detectors on the common interconnect, the interconnect signals indicative of events detected by the plurality of event detectors, wherein the at least one receiver is electrically isolated from the common interconnect, and wherein the electrical isolation comprises one of optical isolation, inductive isolation and capacitive isolation;
a base station in communication with the at least one receiver, the base station comprising a processor configured to generate interconnect data associated with a first event detector among the plurality of event detectors, the interconnect data being information about the first event detector based, at least in part, on the interconnect signals, wherein:
the processor generates interconnect metadata indicative of a history of false alerts from at least one event detector of the plurality of event detectors,
each event detector of the plurality of event detectors is associated with each other event detector of the plurality of event detectors, the interconnect metadata is based, at least in part, on data from a sensor that is proximate to the plurality of event detectors, and the sensor data is not associated with the plurality of event detectors; and a transmitter configured to transmit the interconnect data to a computing device via a network interface.

2. The system of claim 1, wherein the interconnect data associated with the first event detector includes information indicative of an alert status of the first event detector, an operational status of the first event detector, identifying information for the first event detector, or a combination thereof.

3. The system of claim 1, wherein the processor generates the interconnect metadata using secondary data associated with the interconnect signals, the interconnect metadata being information providing context to the interconnect data obtained from sources external to the common interconnect.

4. The system of claim 3, wherein the secondary data includes sensor data provided by sensors unassociated with the plurality of event detectors.

5. The system of claim 3, wherein the secondary data includes information about a second event detector of plurality of event detectors determined, at least in part, from the interconnect signals.

6. The system of claim 1, wherein the computing device comprises a virtual computing device operating on a server.

7. The system of claim 1, wherein the transmitter comprises a wireless transmitter.

8. A computer-implemented method comprising:

receiving, at a base station, data from a first monitor device monitoring interconnect signals propagating among a plurality of event detectors on a common interconnect, the interconnect signals indicative of events detected by the plurality of event detectors, the plurality of event detectors interconnected via the common interconnect, wherein each of the plurality of event detectors comprises a radio frequency detector, at least two optical isolation devices and at least two signal translators, and wherein the base station is electrically isolated from the common interconnect, and wherein the electrical isolation comprises one of optical isolation, inductive isolation and capacitive isolation;

analyzing, at the base station, the data received from the first monitor device to generate a status report associated with a first event detector among the plurality of event detectors, the status report including information about the first event detector inferred, in part, from the interconnect signals, wherein:

the information about the first event detector comprises metadata indicative of a history of false alerts from the first event detector, each event detector of the plurality of event detectors is associated with each other event detector of the plurality of event detectors, the metadata is based, at least in part, on data from a sensor that is proximate to the plurality of event detectors, and the sensor data is not associated with the plurality of event detectors; and transmitting the status report to a remote client via a network interface.

9. The method of claim 8, wherein the data received from the monitor device is raw data sent by the first monitor device without analyzing the interconnect signals.

10. The method of claim 9, further comprising:

analyzing the data to generate interconnect data associated with the first event detector the interconnect data being information about the first event detector inferred, in part, from the interconnect signals.

11. The method of claim 8, wherein transmitting the status report is responsive to a request received from the remote client via the network interface.

12. The method of claim 8, further comprising:

receiving an alert instruction from the remote client via the network interface, the alert instruction associated with a request to cause the first event detector to generate a sensory notification.

13. The method of claim 12, wherein the alert instruction is unassociated with an event a first event detector is configured to detect.

14. The method of claim 12, further comprising:

in response to receiving the alert instruction, generating an alert signal configured to cause the first event detector to generate the sensory notification.

15. The method of claim 12, further comprising:

in response to receiving the alert instruction, causing the first event detector to generate the sensory notification to the first monitor device to transmit onto the common interconnect.

16. A system comprising one or more computing devices that comprise a first set of instructions to be performed that cause the system to at least:

receive data at a base station in communication with a server, the data associated with interconnect signals propagating among a plurality of event detectors on a common interconnect, the interconnect signals indicative of events detected by the plurality of event detectors, the plurality of event detectors interconnected via the common interconnect, wherein each of the plurality of event detectors comprises a radio frequency detector, at least two optical isolation devices and at least two signal translators, and wherein the base station is electrically isolated from the common interconnect, and wherein the electrical isolation comprises one of optical isolation, inductive isolation and capacitive isolation;

analyze, at the base station, the received data to generate a status report associated with a first event detector among the plurality of event detectors, the status report including information about the first event detector inferred, in part, from the interconnect signals, wherein:

the information about the first event detector comprises metadata indicative of a history of false alerts from the first event detector, each event detector of the plurality of event detectors is associated with each other event detector of the plurality of event detectors, the metadata is based, at least in part, on data from a sensor that is proximate to the plurality of event detectors, and the sensor data is not associated with the plurality of event detectors; and transmit the status report to a remote client of the server.

17. The system of claim 16, wherein the base station is coupled to a monitor device monitoring the interconnect signals.

18. The system of claim 16, wherein the data is received from a monitor device monitoring the interconnect signals via an interface with the common interconnect.

19. The system of claim 16, wherein transmitting the status report is responsive to a request received by the server from the remote client.

20. The system of claim 1, wherein the indirect coupling is one of optical, inductive and capacitive.

* * * * *